United States Patent [19]
Be

[11] Patent Number: 6,099,023
[45] Date of Patent: Aug. 8, 2000

[54] BOTTOM CASE FOR BOWLING BAGS

[76] Inventor: Sung Hoan Be, 887-50 Kumdan-Dong Buk-Gu, Taegu, Rep. of Korea

[21] Appl. No.: 09/251,754

[22] Filed: Feb. 18, 1999

[51] Int. Cl.$^7$ .................................. B62B 1/12; A45C 5/14
[52] U.S. Cl. ................. 280/655; 280/47.19; 280/47.315; 206/315.91; 190/18 A
[58] Field of Search .............................. 280/655, 655.1, 280/652, 654, 47.19, 47.24, 47.315, 79.5, 79.6, 37, 47.26; 206/315.91, 315.1, 315.9; 190/18 A

[56] References Cited

U.S. PATENT DOCUMENTS

| | | | |
|---|---|---|---|
| 3,998,476 | 12/1976 | Kazmark, Sr. | 280/655 |
| 5,074,571 | 12/1991 | Reese | 280/47.19 |
| 5,335,759 | 8/1994 | Yeh | 190/115 |
| 5,367,743 | 11/1994 | Chang | 16/115 |
| 5,431,428 | 7/1995 | Marchwiak et al. | 280/655 |
| 5,607,175 | 3/1997 | Bae | 280/655 |
| 5,791,469 | 8/1998 | Be | 206/315.91 |
| 5,791,667 | 8/1998 | Knoll | 280/47.19 |
| 5,794,773 | 8/1998 | Moyer | 206/315.91 |
| 6,010,145 | 1/2000 | Liu | 280/655.1 |

Primary Examiner—Brian L. Johnson
Assistant Examiner—Bridget Avery
Attorney, Agent, or Firm—Richard T. Holzmann

[57] ABSTRACT

A bottom case for bowling bags is disclosed. One or two partition walls are integrally formed in the bottom case, thus forming one, two or three cells in said case. The cells are for separately receiving the bowling balls in the case. A dish-shaped shell is integrally and interiorly formed on the bottom wall at a position inside each of the cells and stably seats a bowling ball in each cell. Two corner supports are integrally formed along the rear corners of the rear cell, thus supporting a bowling ball seated in the rear cell. The bottom case is integrated with a cloth or synthetic leather bag body. A bowling shoes bag is separately provided on the top of the bag body. The bottom case is also integrated with an auxiliary bag at the sidewall, thus receiving bowling accessories, such as towels, protectors and packed bowling powder. The bottom case of this invention thus allows a bowling bag to receive and carry one, two or three bowling balls along with such bowling accessories at the same time.

4 Claims, 5 Drawing Sheets

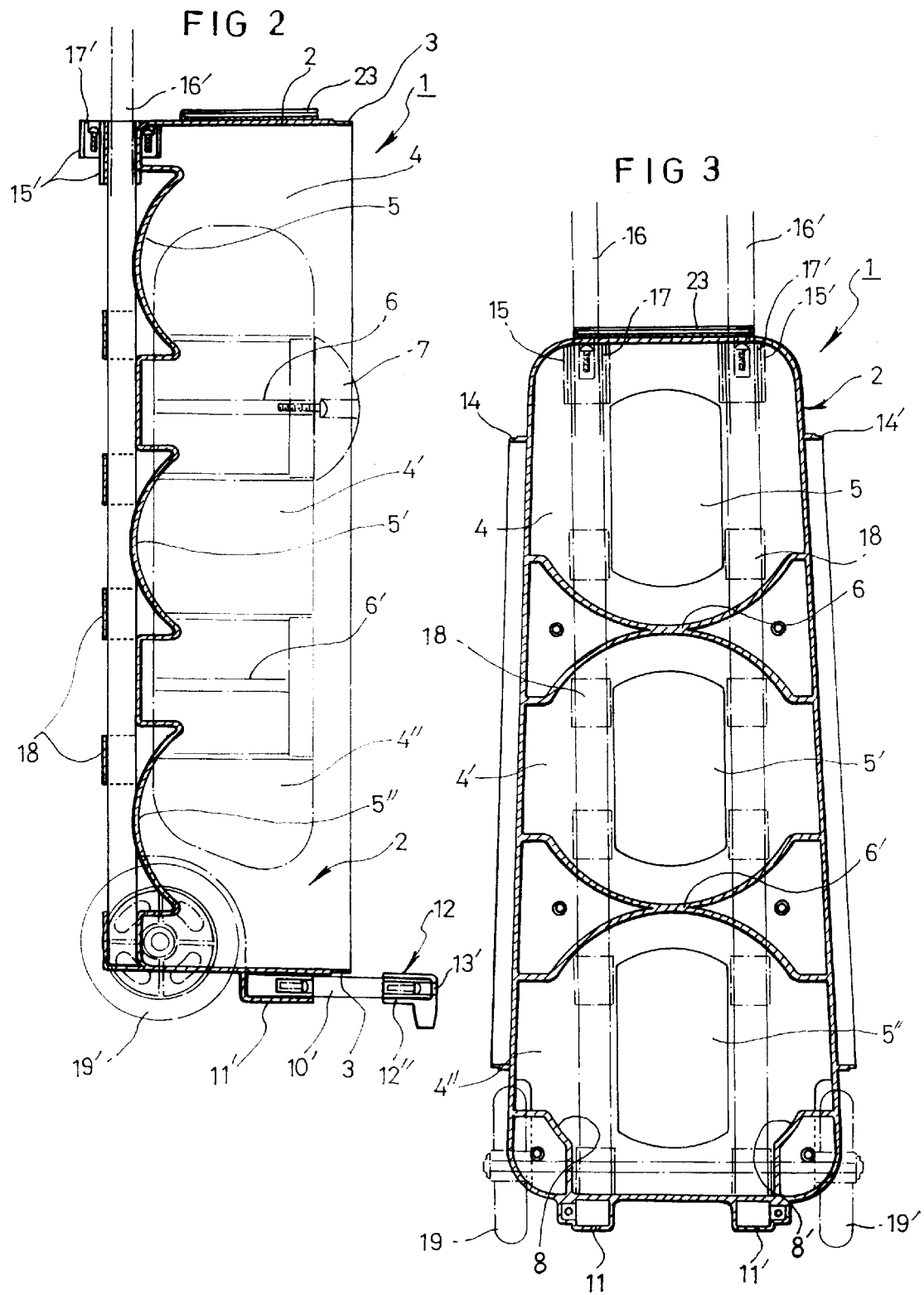

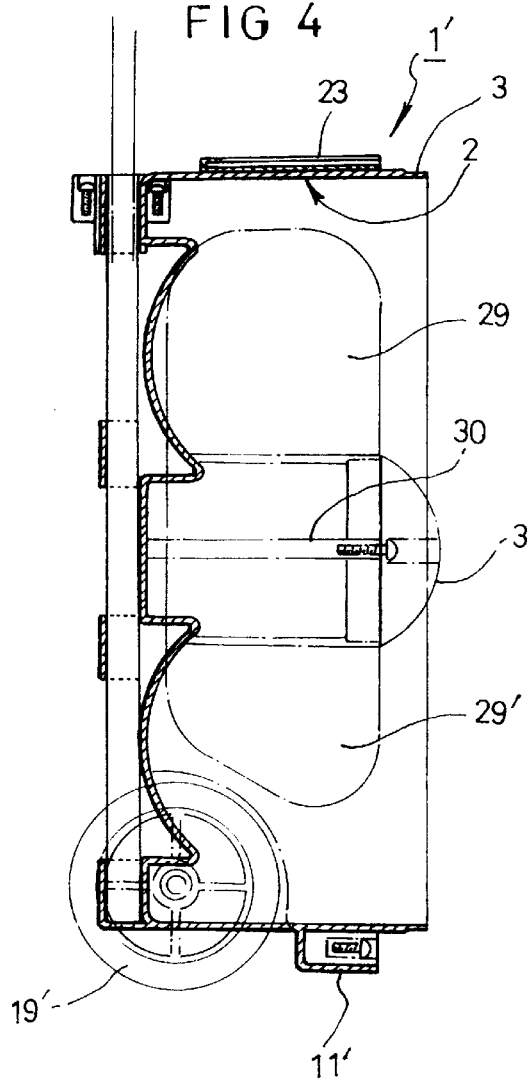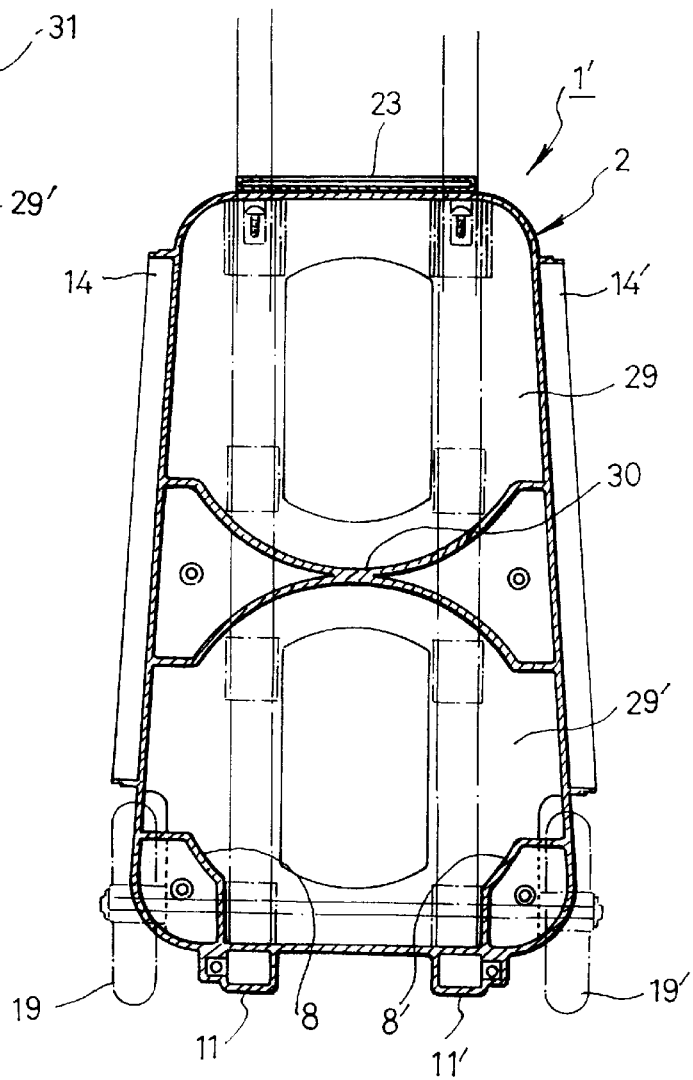

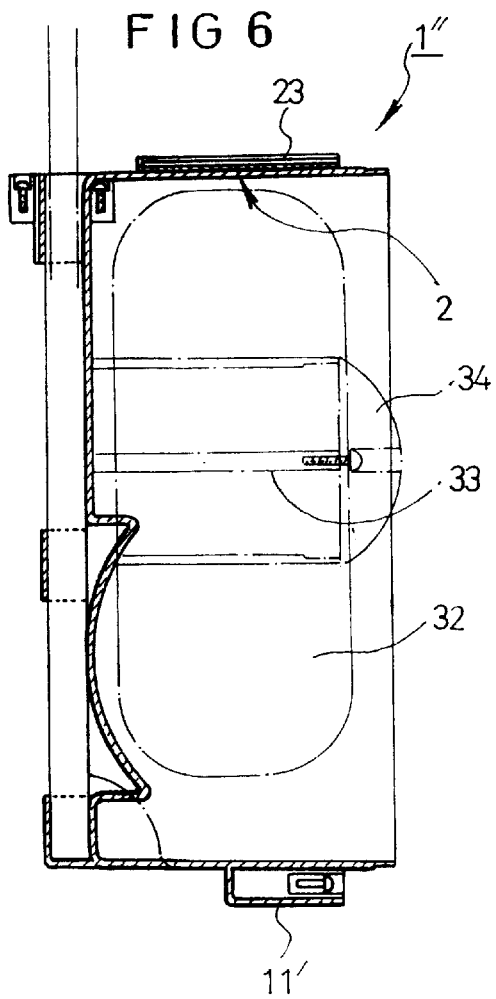
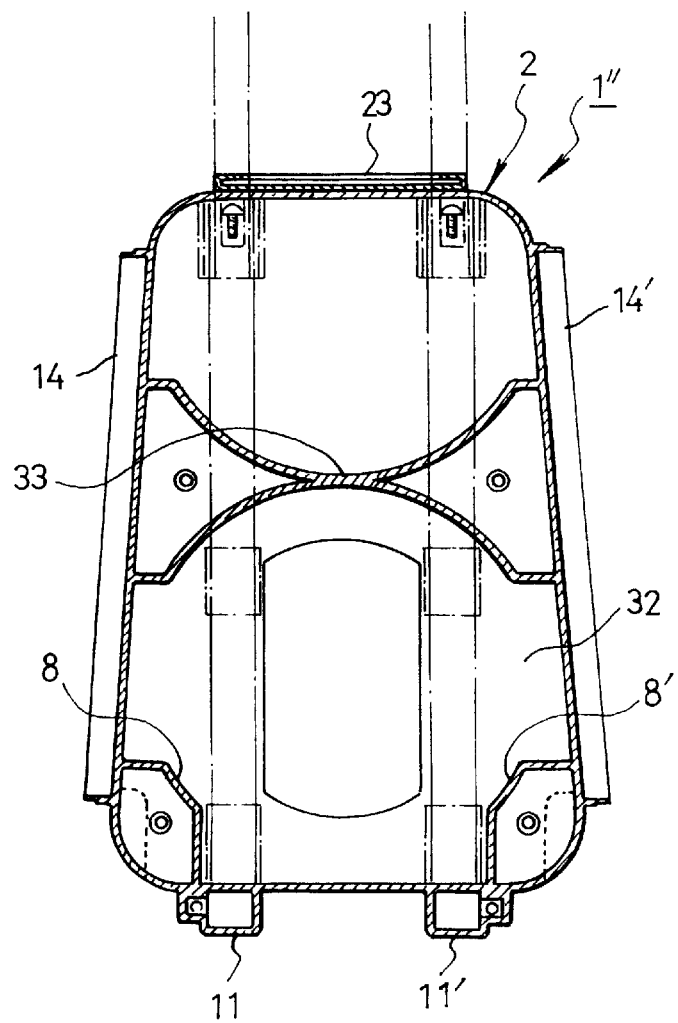

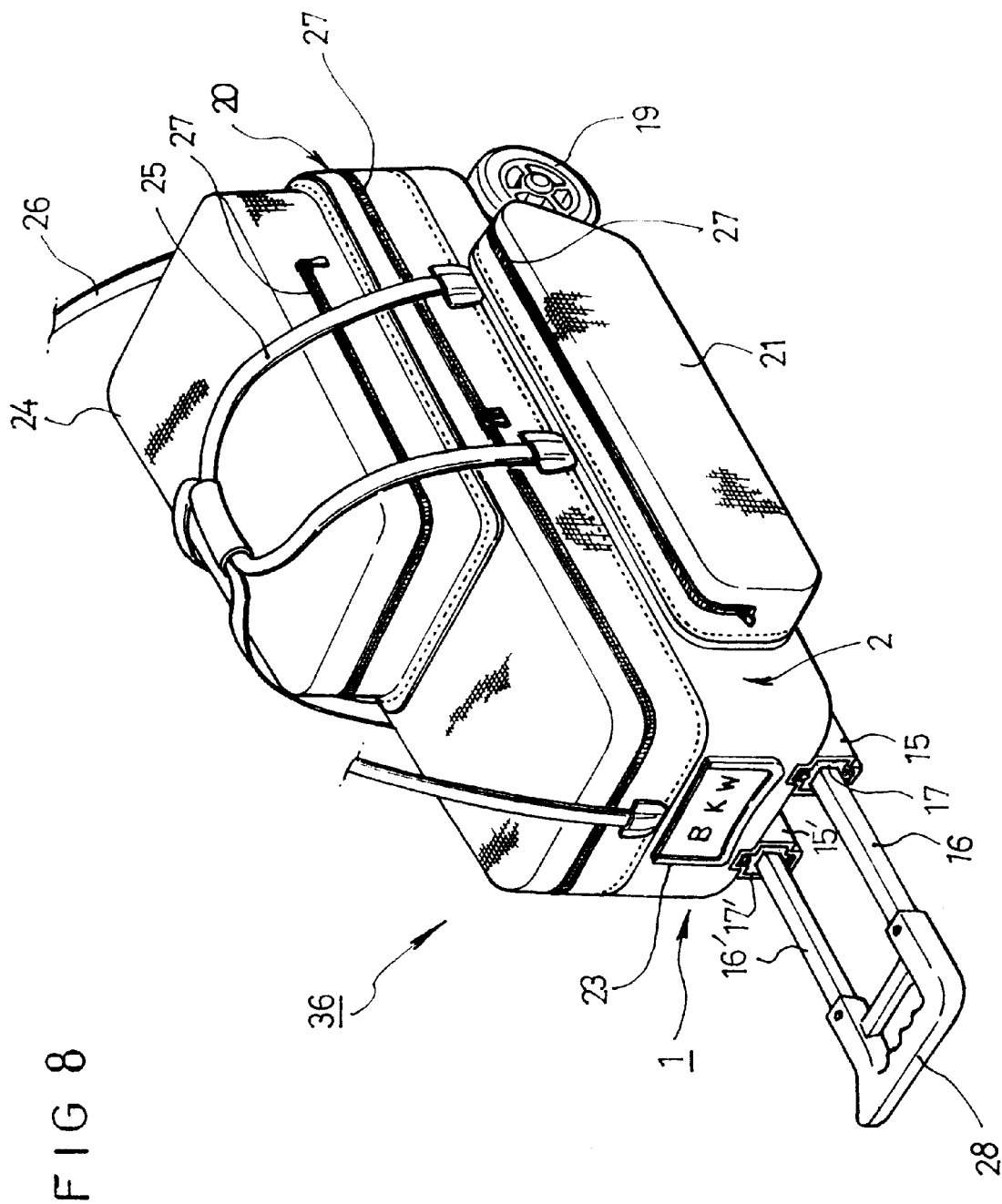

BOTTOM CASE FOR BOWLING BAGS

BACKGROUND OF THE INVENTION

1. Field of the Invention

The present invention relates, in general, to a bottom case for bowling bags and, more particularly, to a structural improvement in such a bottom case to more effectively and easily receive and carry a plurality of bowling balls and bowling accessories, such as bowling shoes, towels, protectors and packed bowling powder, at the same time.

2. Description of the Prior Art

Typically, bowlers individually use several bowling balls with different colors, weights and finger holes in accordance with one's liking or in an effort to train systematically or to enjoy oneself by bowling positively. It is thus necessary for some bowlers to carry a plurality of bowling balls and bowling accessories, such as bowling shoes, towels, protectors and packed bowling powder, at the same time.

The inventor of this invention proposed a bowling bag in U.S. Pat. No. 5,607,175. Said above bowling bag comprises a longitudinal bottom case provided with a plurality of dish-shaped shells integrally and regularly arranged along the axis of said bottom case. In addition, a telescopic handle frame is attached to the bottom case, while a wheel is removably attached to each rear corner of said bottom case at a position opposite to the handle frame, thus allowing a user to move the bag on the ground with both the handle of said telescopic handle frame being gripped by a user's hand and the wheels being rolled on the ground. An upper bag body, made of cloth or synthetic leather, is integrated with the bottom case by sewing the lower edges of the bag body to the top edges of the bottom case, thus forming a desired bowling bag.

However, the above bowling bag is problematic in that it forces a user to carry the bag while almost laying the bag on the longitudinal bottom so as to stably maintain the balls on the shells. The bowling bag is thus inconvenient to users while carrying the bag. When a user moves the bag while almost standing said bag on the rear end, the heavy balls cannot be not stably retained on the shells, but are undesirably removed from the shells and lean to the rear end of the bag, thus causing the rear end of the upper bag body to be partially overloaded. This deforms the upper bag body and spoils the appearance of said bag. Such a leaning of the heavy balls also may break the bag at the sewn parts between the upper bag body and the bottom housing. In addition, the balls, leaning to the rear end of the bag, may collide on each other so as to generate frictional noises and scratch each other.

The above bowling bag is also designed to be kept while being laid on its longitudinal bottom, so that the bag is inconvenient to a user who wants to keep the bag. Another problem, experienced in the above bowling bag, is that it is designed to merely have a capacity capable of receiving two balls, but is free from any means for receiving bowling accessories, such as bowling shoes, protectors, towels and packed bowling powder. This forces the users to carry such bowling accessories using another carrier in addition to the bag.

SUMMARY OF THE INVENTION

Accordingly, the present invention has been made keeping in mind the above problems occurring in the prior art, and an object of the present invention is to provide a bottom case for bowling bags which is structurally improved so as to effectively and easily receive and carry one, two or three bowling balls along with bowling accessories, such as bowling shoes, towels, protectors and packed bowling powder, at the same time.

In order to accomplish the above object, the present invention provides a bottom case for bowling bags, comprising: a sidewall integrally extending upwardly from the edge of the bottom wall to a height, thus forming a housing of the bottom case, said sidewall being attached to a cloth or synthetic leather bag body at its top edge, thus forming a bowling bag, said height of the sidewall being designed to completely cover a diameter of a bowling ball received in the bottom case; partitioning means integrally extending in the interior of the housing so as to form at least one bowling ball cell in the housing, said partitioning means being covered with a top cover at its top end, said top cover being chamfered at its top edge, thus having a smooth edge; a dish-shaped shell integrally formed on the bottom wall at a position inside the cell, thus supporting a bowling ball seated in the cell; two corner supports integrally formed along two rear corners of the cell so as to support the bowling ball seated in the cell, each of said corner supports being covered with a support cover at its top end, said support cover being chamfered at its top edge, thus having a smooth edge; two pipe holders exteriorly mounted on the rear end of the sidewall and individually receiving a connection pipe; a rear handle having two coupling pipes at both ends thereof and fixedly mounted to the top ends of the two connection pipes by coupling the two coupling pipes to the top ends of said two connection pipes; a side mount edge exteriorly formed on the sidewall, thus allowing an auxiliary bag, made of cloth or synthetic leather, to be attached to the sidewall; two support pipes exteriorly mounted to the bottom wall of the housing and individually and closely receiving a fitting member; a plurality of pipe holding members exteriorly mounted on the bottom wall of the housing in two axial lines aligned with the two support pipes; two parallel telescopic pipes held by the two support pipes and the pipe holding members, thus being firmly attached to the bottom wall of the housing; and a wheel rotatably mounted to a rear end of each of the two telescopic pipes.

In accordance with the bottom case for bowling bags of this invention, it is possible to keep or carry one, two or three bowling balls while stably seating them in their partitioned cells without any fear of removal of the balls from the cells. The bottom case of this invention also allows a user to keep or handle the bag while selectively laying or standing the bag as desired. Another advantage of the above bottom case resides in that it allows a bowling bag to receive and carry bowling accessories, such as bowling shoes, protectors, towels and packed bowling powder, in addition to the bowling balls.

BRIEF DESCRIPTION OF THE DRAWINGS

The above and other objects, features and other advantages of the present invention will be more clearly understood from the following detailed description taken in conjunction with the accompanying drawings, in which:

FIG. 2 is a side sectional view of the bottom case of FIG. 1;

FIG. 3 is a plan sectional view of the bottom case of FIG. 1;

FIG. 4 is a side sectional view of a bottom case for bowling bags with two cells in accordance with the second embodiment of the present invention;

FIG. 5 is a plan sectional view of the bottom case of FIG. 4;

FIG. 6 is a side sectional view of a bottom case for bowling bags with one cell in accordance with the third embodiment of the present invention;

FIG. 7 is a plan sectional view of the bottom case of FIG. 6; and

FIG. 8 is a perspective view of a bowling bag comprising a bottom case of this invention integrated with a cloth or synthetic leather bag body.

DESCRIPTION OF THE PREFERRED EMBODIMENTS

Figure 1:
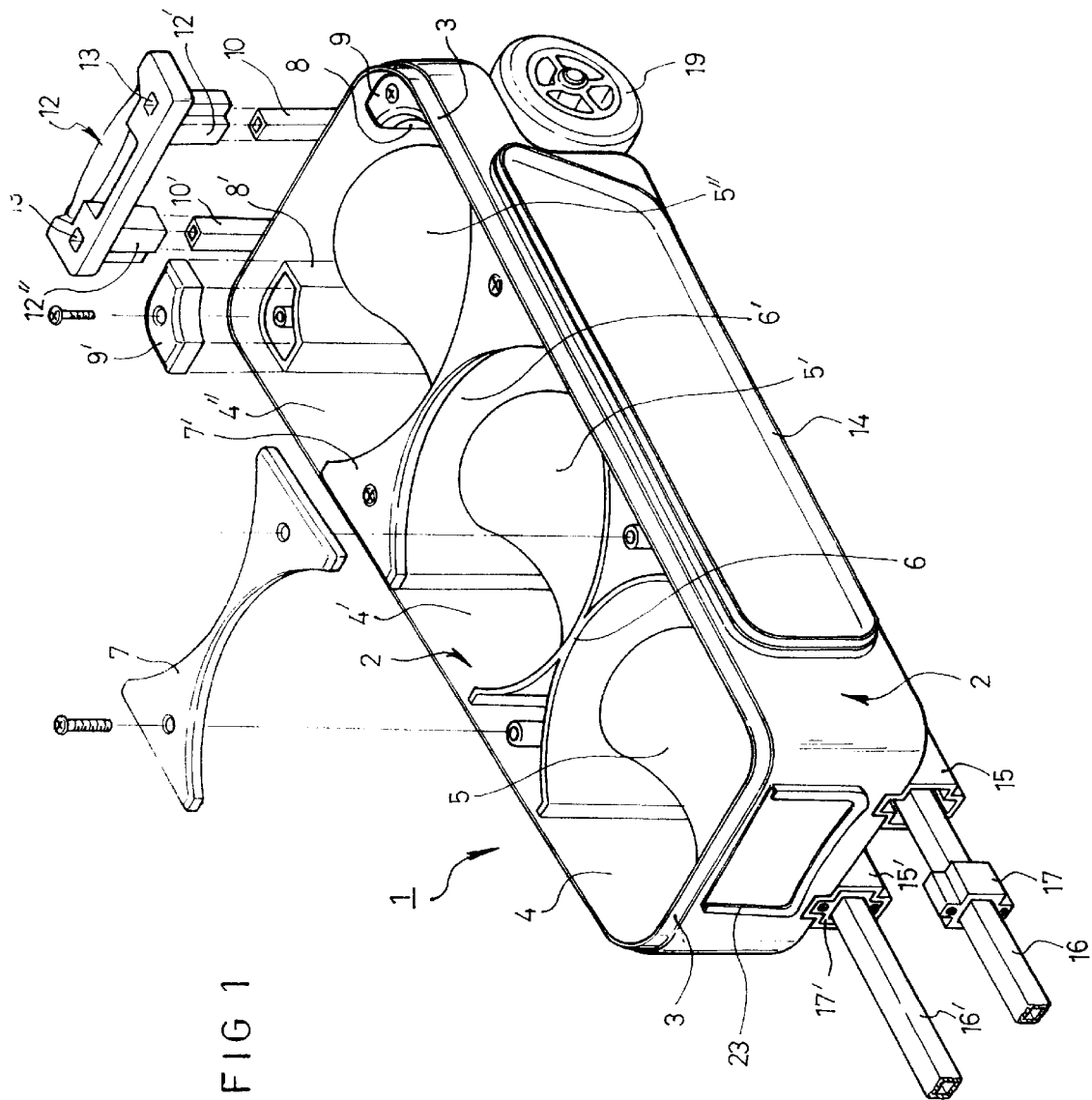
FIG. 1 is a partially exploded perspective view of a bottom case for bowling bags with three cells in accordance with the primary embodiment of the present invention.

FIG. 1 is a partially exploded perspective view of a bottom case for bowling bags in accordance with the primary embodiment of this invention. FIG. 2 is a side sectional view of the above bottom case. FIG. 3 is a plan sectional view of the above bottom case. FIG. 8 is a perspective view of a bowling bag comprising the above bottom case integrated with a bag body.

As shown in the drawings, the bottom case 1 for bowling bags according to the primary embodiment has a sidewall 2, which integrally extends from the edges of a bottom wall to a height, thus forming a housing. The height of the sidewall 2 is designed to completely cover the diameter of a bowling ball 22 seated in the bottom case 1. In such a case, a bag body 20, made of cloth or synthetic leather, is attached along the top edge 3 of the sidewall 2 through a sewing process, while a bowling ball 22 is seated on an associated shell integrated with the interior bottom of the case 1. In the primary embodiment, the interior of the bottom case 1 is partitioned into three cells 4, 4' and 4", which are arranged along the axis of the longitudinal bottom case 1 and are individually provided with a dish-shaped shells 5, 5', 5" at the bottom. The three cells 4, 4' and 4" are separated from each other using two partition walls 6 and 6' which are integrally formed in the case 1. Each of the two partition walls 6 and 6' is covered with a top cover 7, 7' at its top end. The two top covers 7 and 7' are individually chamfered at its top edge, thus having a smooth edge. Of the three cells 4, 4' and 4", the third one 4" is interiorly provided with two corner supports 8 and 8'. The two corner supports 8 and 8' are integrally and interiorly formed along the rear corners the third cell 4" and are individually covered with a support cover 9, 9'.

Two pipe holders 11 and 11' are exteriorly mounted on the rear end of the sidewall 2 and individually receive the lower end of a connection pipe 10, 10'. A rear handle 12 is mounted to the top ends of the two connection pipes 10 and 10' by fitting two coupling pipes 12' and 12" of the rear handle 12 over the top ends of said two connection pipes 10 and 10'. The rear handle 12 is screwed to the pipe holders 11 and 11', so that the rear handle 12 is fixedly mounted to the bottom case 1. In order to allow the rear handle 12 to be screwed to the pipe holders 11 and 11', the two pipe holders 11 and 11' are individually provided with a screw hole, while the rear handle 12 has two screw holes 13 and 13' at positions corresponding to the screw holes of the two pipe holders 11 and 11'.

Two side mount edges 14 and 14' are exteriorly formed on the sidewall 2 at opposite positions, thus allowing two auxiliary bags 21, made of cloth or synthetic leather, to be attached to the sidewall 2.

Two support pipes 15 and 15' are mounted to the outside bottom of the case 1 and individually and closely receive a fitting member 17, 17'. The two fitting members 17 and 17' are used for holding two telescopic pipes 16 and 16', respectively. Each of the above telescopic pipes 16 and 16' is also held by a plurality of pipe holding members 18 which are firmly mounted on the outside bottom of the case 1 in an axial line. The above pipes 16 and 16' are thus firmly attached to the outside bottom of the case 1 while being parallel to each other. A wheel 19, 19' is rotatably mounted to the rear end of each telescopic pipe 16, 16', so that the wheels 19 and 19' selectively roll on the ground when the bag is moved by a user.

In the drawings, the reference numeral 23 denotes a name panel, 24 denotes a bowling shoes bag mounted to the top of the bag body 20, 25 denotes a hand belt, 26 denotes a shoulder belt, 27 denotes a fastener or a zipper, 28 denotes a handle bar mounted to the outside ends of the two telescopic pipes 16 and 16', and 36 denotes the bowling bag comprising the bottom case 1 of this invention.

FIG. 4 is a side sectional view of a bottom case for bowling bags in accordance with the second embodiment of this invention. FIG. 5 is a plan sectional view of the bottom case of FIG. 4. In the second embodiment, the interior of the bottom case 1' is partitioned into two cells 29 and 29', which are arranged along the axis of the longitudinal bottom case 1'. The two cells 29 and 29' are separated from each other using one partition wall 30. The above partition wall 30 is covered with a top cover 31 at its top end. In a brief description, the general shape of the case 1' according to the second embodiment remains the same as that described for the primary embodiment, but the number of the cells is two different from the primary embodiment.

FIG. 6 is a side sectional view of a bottom case for bowling bags in accordance with the third embodiment of this invention. FIG. 7 is a plan sectional view of the bottom case of FIG. 6. In the third embodiment, the interior of the bottom case 1" is provided with one cell 32. The bottom case 1" is also provided with one partition wall 33 for separating the cell 32 from the remaining part of the interior of the bottom case 1". The above partition wall 33 is covered with a top cover 34 at its top end. In a brief description, the general shape of the case 1" according to the third embodiment remains the same as that described for the primary embodiment, but the number of the cells is one different from the primary embodiment.

In order to assemble the bag having the bottom case 1 according to the primary embodiment, the two partition walls 6 and 6', integrally formed in the interior of the bottom case 1 so as to partition the interior of said case 1 into the three cells 4, 4' and 4", are primarily covered with the top covers 7 and 7'. Of course, the top covers 7 and 7' are individually chamfered at the top edge. The two top covers 7 and 7' are screwed to the top ends of said partition walls 6 and 6'. In addition, the two supports 8 and 8', integrally formed in the third cell 4", are individually covered with a support cover 9, 9'. The two support covers 9 and 9' are screwed to the top ends of the two supports 8 and 8' in the same manner as that described for the two top covers 7 and 7'. Thereafter, each of the two telescopic pipes 16 and 16' is held by the holding members 18 which are firmly mounted to the outside bottom of said case 1. A fitting member 17, 17' is fitted into and screwed to each of the two support pipes 15 and 15' of the case 1 with the two telescopic pipes 16 and 16' respectively passing through the two fitting members 17 and 17'. Therefore, the two telescopic pipes 16 and 16' are firmly mounted on the outside bottom of the case 1.

A wheel 19, 19' is rotatably mounted to the rear end of each telescopic pipe 16, 16', thereby completely assembling the bottom case. After assembling the bottom case 1, a bag body 20, made of cloth or synthetic leather, is attached along the top edges 3 of the sidewall 2 through a sewing process.

Thereafter, the lower ends of the two connection pipes 10 and 10' are respectively fitted into the two pipe holders 11 and 11' of the bottom case 1. A rear handle 12 is mounted to the top ends of the two connection pipes 10 and 10' by fitting the two coupling pipes 12 and 12' of said rear handle 12 over the top ends of the two connection pipes 10 and 10'. In such a case, the rear handle 12 is screwed to the pipe holders 11 and 11', thus fixedly mounting the rear handle 12 to the bottom case 1. Therefore, a bowling bag 36 of this invention is completely formed.

The operational effect of the bowling bag provided with a bottom case of this invention will be described hereinbelow.

When it is necessary to receive or remove bowling balls 22 into or from the partitioned cells 4, 4' and 4" of the bag, the bag body 20 is primarily opened by operating the fastener 27 of said bag body 20 with the bottom case 1 being stood on its longitudinal bottom. In such a case, each ball 22 is stably seated on the dish-shaped shell 5, 5', 5" of an associated cell 4, 4', 4". When the bowling balls 22 are seated in the cells 4, 4' and 4" of the bottom case 1 as described above, the top covers 7 and 7', attached to the top ends of the two partition walls 6 and 6' and smoothly chamfered at their top edges, smoothly guide the balls 22 into the cells 4, 4' and 4" while being free from scratching or damaging the surface of said balls 22.

After receiving the bowling balls 22 into the bag 36, the bag body 20 is closed by the fastener 27. Thereafter, the bag 36 may be stood on its rear end. In such a case, the rear handle 12 of the bottom case 1 stably supports said bag 36 standing on the rear end.

When the bag 36 is stood on its rear end as described above, the three balls 22 are supported by the shells 5, 5' and 5" inside the cells 4, 4' and 4", respectively. In addition, the two balls 22, received in the first and second cells 4 and 4", are also supported by the two partition walls 6 and 6', respectively, while the ball 22, received in the third cell 4", is also supported by the two corner supports 8 and 8'. Therefore, the three balls 22 are stably held in the cells 4, 4' and 4", respectively, without being removed from the cells 4, 4' and 4". Therefore, the balls 22 are not leaned to the rear end of the bag 36 even when the bag 36 is stood on the rear end. When the above bag 36, loaded with the three balls 22, is moved, the bag 36 may be easily carried by a user while being almost stood on the rear end or being almost laid on the longitudinal bottom with the handle bar 28 being gripped by a user's hand. In such a case, the three balls 22 are stably supported on the shells 5, 5' and 5" inside the cells 4, 4' and 4", respectively, so that the balls 22 are prevented from undesirably leaning to the rear end of the bag body 20. In addition, the two partition walls 6 and 6' effectively separate the three balls 22 from each other, thus preventing the balls 22 from colliding on each other. This prevents the balls 22 from generating frictional noise or scratching each other.

The bowling shoes bag 24, mounted to the top of the bag body 20, receives bowling shoes, while the two auxiliary bags 21, made of cloth or synthetic leather and attached to the sidewall 2, receive bowling accessories, such as towels, protectors and packed bowling powder. That is, the bowling bag 36, having the bottom case 1 according to the primary embodiment of this invention, receives and carries three bowling balls 22 and bowling accessories, such as bowling shoes, protectors, towels and packed bowling powder, at the same time.

On the other hand, the bowling bag, having the bottom case 1' or 1" according to the second or third embodiment of the invention, yields the same operational effect as that described for the primary embodiment, but the number of balls 22 received in the bag is different from that of the bag 36 according to the primary embodiment. Therefore, further explanation for the operational effect of the second and third embodiments is not deemed necessary.

When moving the bowling bag of this invention on a flat surface, a user may pull the bag with the wheels 19 rolling on the surface. However, when moving the bowling bag on an uneven surface, such as stairs, the user may move the bag with the handle 25 gripped by a user's hand or the shoulder belt 26 beared on a user's shoulder.

As described above, the present invention is for improving the structure of the bowling bag disclosed in U.S. Pat. No. 5,607,175, so that the invention provides a structurally improved bottom case for bowling bags. In accordance with the invention, it is possible to keep or carry one, two or three bowling balls while stably seating them in their partitioned cells without any fear of removal of the balls from the cells. The bottom case of this invention also allows a user to keep or handle the bag while selectively laying or standing the bag as desired.

Another advantage of this invention resides in that the bowling bag having the bottom case of this invention receives and carries bowling accessories, such as bowling shoes, protectors, towels and packed bowling powder, in addition to the bowling balls, thus improving the utility of the bowling bags. Since the bottom case of this invention keeps or carries the bowling balls without any fear of removal of the balls from the cells, the bag body, made of cloth or synthetic leather, is prevented from being undesirably deformed or broken. This allows a bowling bag to be used for a lengthy period of time.

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

What is claimed is:

1. A bottom case for bowling bags, comprising:

a sidewall integrally extending upwardly from an edge of a bottom wall to a height, thus forming a housing of said bottom case, said sidewall being attached to a cloth or synthetic leather bag body at its top edge, thus forming a bowling bag, said height of the sidewall being designed to completely cover a diameter of a bowling ball received in the bottom case;

partitioning means integrally extending in the interior of said housing so as to form at least one bowling ball cell in the housing, said partitioning means being covered with a top cover at its top end, said top cover being chamfered at its top edge, thus having a smooth edge;

a dish-shaped shell integrally formed on the bottom wall at a position inside the cell, thus supporting a bowling ball seated in the cell;

two corner supports integrally formed along two rear corners of the cell so as to support the bowling ball seated in the cell, each of said corner supports being covered with a support cover at its top end, said support cover being chamfered at its top edge, thus having a smooth edge;

two pipe holders exteriorly mounted on a rear end of the sidewall and individually receiving a connection pipe;

a rear handle having two coupling pipes at both ends thereof and fixedly mounted to top ends of the two connection pipes by coupling the two coupling pipes to the top ends of said two connection pipes;

a side mount edge exteriorly formed on the sidewall, thus allowing an auxiliary bag, made of cloth or synthetic leather, to be attached to said sidewall;

two support pipes exteriorly mounted to the bottom wall of the housing and individually and closely receiving a fitting member;

a plurality of pipe holding members exteriorly mounted on the bottom wall of the housing in two axial lines aligned with the two support pipes;

two parallel telescopic pipes held by the two support pipes and the pipe holding members, thus being firmly attached to the bottom wall of the housing; and a wheel rotatably mounted to a rear end of each of said two telescopic pipes.

2. The bottom case according to claim 1, wherein said partitioning means comprises two partition walls dividing the interior of said housing into three bowling ball cells.

3. The bottom case according to claim 1, wherein said partitioning means comprises one partition wall dividing the interior of the housing into two bowling ball cells.

4. The bottom case according to claim 1, wherein said partitioning means comprises one partition wall forming one bowling ball cell in the housing, said one cell being separated from a remaining part of the interior of said housing by the partition wall.

* * * * *